Nov. 5, 1935.　　　R. F. PEO　　　2,019,725
INDIVIDUAL WHEEL SUSPENSION
Filed Feb. 10, 1934　　3 Sheets-Sheet 1
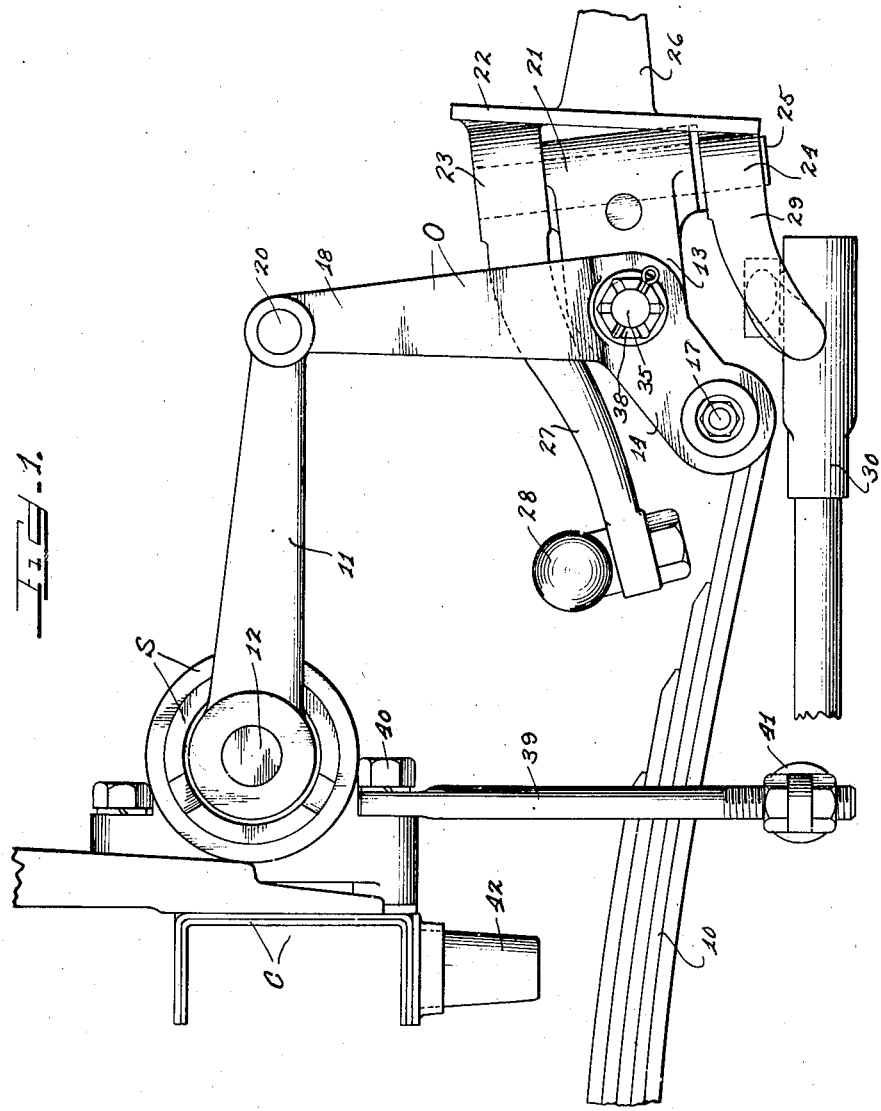

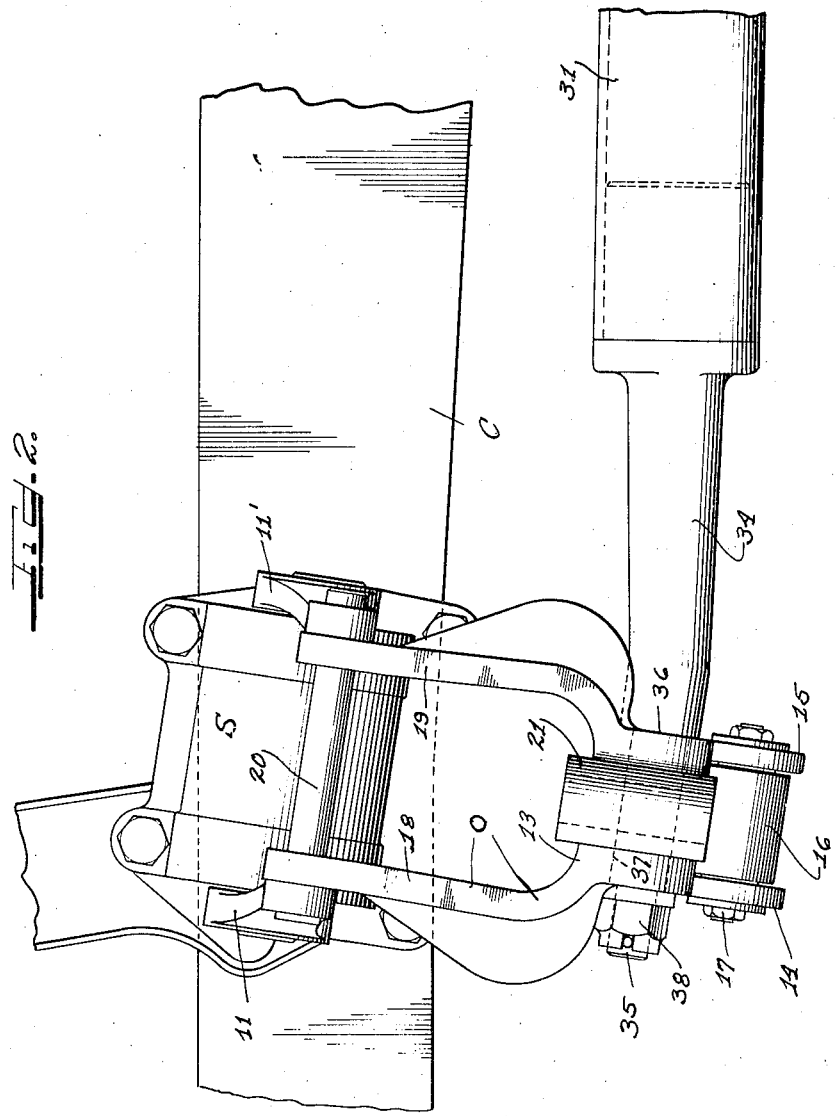

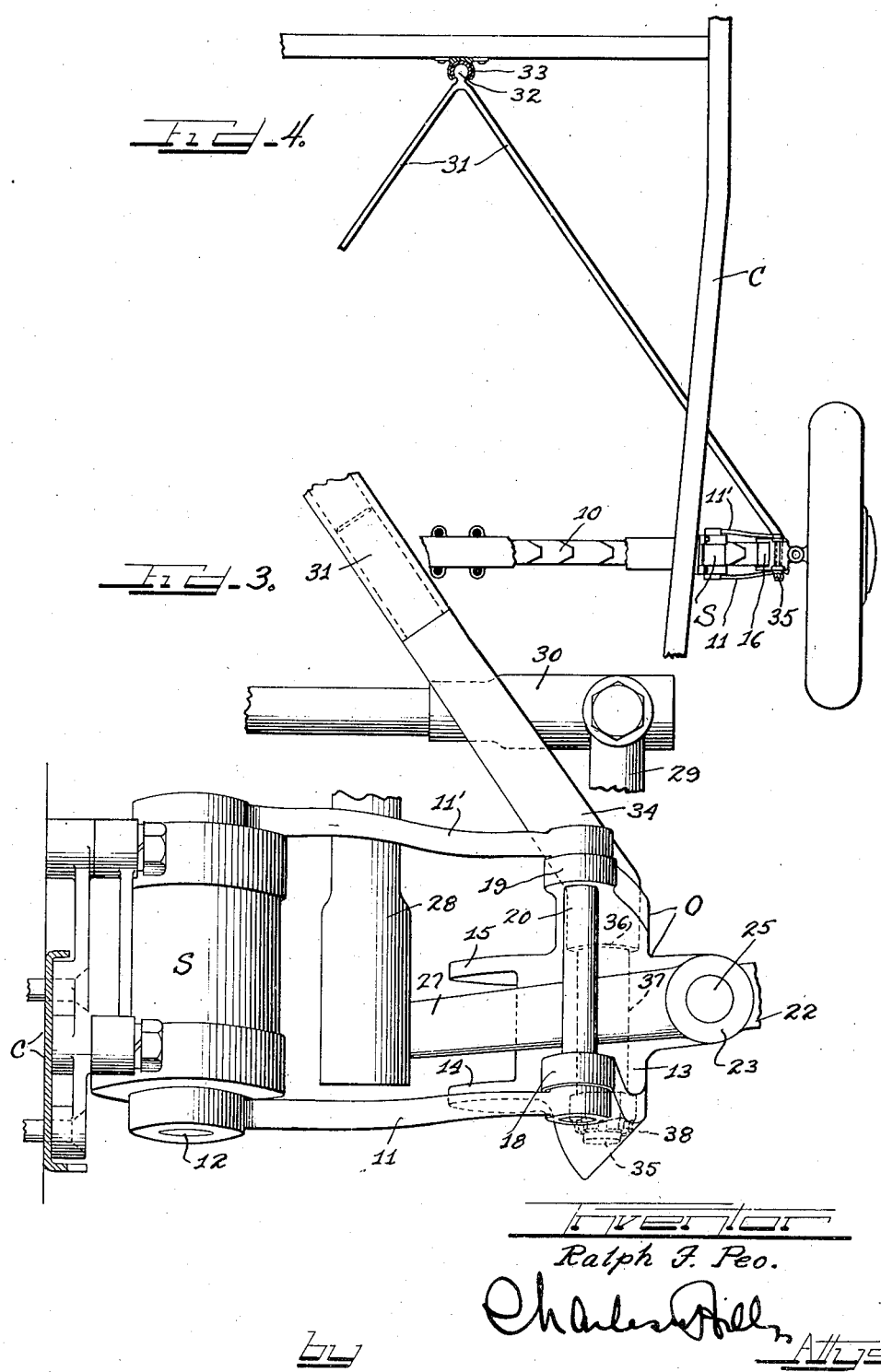

Patented Nov. 5, 1935

2,019,725

UNITED STATES PATENT OFFICE 2,019,725

INDIVIDUAL WHEEL SUSPENSION

Ralph F. Peo, Buffalo, N. Y., assignor to Houde Engineering Corporation, Buffalo, N. Y., a corporation of New York Application February 10, 1934, Serial No. 710,649

1 Claim. (Cl. 267—19)

My invention relates to individual wheel suspension for automotive vehicles and particularly to that type of suspension in which the end of a transversely extending cantilever spring forms one of the links of the linkage quadrilateral between the vehicle body and the wheel to be suspended, the invention being of particular advantage in connection with front wheel suspension.

In individual wheel suspension the suspension linkage and the wheel supporting spindle structure are subjected to longitudinal strain and distortion in a direction fore and aft of the vehicle due to the push of the wheel and to brake torque, and it is therefore an important object of the invention to provide improved means for taking up these forces and relieving the suspension structure of such longitudinal strain but without interfering with the proper functioning of the suspension linkage and the proper vertical movement of either wheel without interference with the other wheel.

The bracing and strain relieving means which I prefer to use is in the form of a wish-bone radius rod structure properly fulcrumed at its apex on the vehicle chassis and with the ends of its legs substantially parallel to the center line of the vehicle and pivoted or journalled in the wheel supporting structure which forms the outer side link of the linkage quadrilateral from which the wheel supporting spindle directly extends or extends from a steering knuckle pivoted on the link.

A further object of the invention is to provide improved means for limiting the approach and separation movement of the chassis and wheel so as to relieve the spring and suspension linkage from unnecessary movement in a vertical direction and resulting strain.

The features of my invention are incoroprated in the structure shown on the drawings, in which drawings:

Figure 1 is a front elevation showing the individual suspension linkage associated with a vehicle;

Figure 2 is a side elevation with the steering knuckle removed;

Figure 3 is a plan view;

Figure 4 is a plan view to reduced scale showing the arrangement and application of the wishbone radius rod structure;

I have shown my invention applied to the type of automobile having a transversely extending cantilever leaf spring 10 at the front secured at its middle to the vehicle chassis frame C. Each end of the spring forms the lower link of the linkage quadrilateral for suspending the corresponding wheel structure. The vehicle body forms the inner side link of the suspension linkage, the upper link structure of the linkage being the two lever arms 11 and 11' secured to and extending from the opposite ends of the piston shaft 12 of a hydraulic shock absorber structure S whose body or housing, which forms the hydraulic working chamber, is rigidly secured to the side of the vehicle chassis. The shock absorber is preferably of the balanced vane type such as the shock absorber structure disclosed in my copending application Serial No. 706,487 filed January 14, 1934.

The outer link structure of the linkage quadrilateral is formed by the member designated as a whole 0. This member comprises a body 13 from which arms 14 and 15 extend downwardly and inwardly to receive between their outer ends the eye 16 formed at the end of the vehicle spring, a pivot bolt 17 extending through the arms and the eye to form the pivot connection.

Arms 18 and 19 extend upwardly from the body 13 and are pivoted to the outer ends of the shock absorber levers 11 and 11' by a pivot bolt 20. Extending outwardly from the body 13 is the knuckle boss 21 for supporting the steering knuckle block or member 22 having the upper and lower bearing lugs 23 and 24 extending inwardly therefrom and between which the knuckle boss 21 is received, the king bolt 25 extending through the lugs and the knuckle boss to pivot the knuckle block to the boss, the knuckle block supporting the spindle or axle 26 on which the vehicle wheel is mounted.

The steering lever 27 extends from the upper lug 23 on the steering knuckle block and is connected with the drag link 28 having connection with the steering wheel of the automobile. The arm 29 extends from the lower bearing lug 24 on the steering knuckle block and is connected with one end of the cross-link 30 which at its other end is connected with the lower lever on the steering knuckle block of the opposite wheel.

The structure thus far described provides individual flexible suspension for the steering wheel of an automobile, the hydraulic shock absorber included in the linkage quadrilateral controlling and absorbing the road shocks. As the vehicle travels the suspension linkage is subjected to twisting strains and horizontal strains and distortion in a direction fore and aft of the vehicle and I will now describe the improved means I have provided for taking up and relieving the suspension linkage from such strains. I provide a brace structure 31 of V-shape or wish-bone shape which at its apex has fulcrum connection with the vehicle chassis at the center line thereof in rear of the spring 10. As shown this brace structure has at its apex a ball 32 for reception in a socket 33 secured to the vehicle chassis and which socket is preferably rubber lined. The legs of the brace structure are preferably of beam construction so that they will withstand compression as well as tension strains. The beams have solid end structures 34 rigidly secured thereto. These end structures are bent at their front ends to be parallel with the longitudinal center line of the vehicle, the outer portions 35 of the bent ends being cylindrical to form bearing pins and to leave abutment shoulders 36. The bodies 13 of the outer link structures 9 at opposite sides of the vehicle have each a bearing bore 37 therethrough whose axis is parallel with the center line of the vehicle and practically in the horizontal plane of the center line of the wheel. The cylindrical ends 35 of the brace structure are inserted in the bores with the shoulders 36 abutting against the rear sides of the link bodies 13, and the ends 35 are threaded to receive a nut 38 for engaging against the front side of the link body 13. The V-shape or wishbone shaped radius rod or brace structure is thus universally fulcrumed at its apex and at its front ends is journalled in the link members 9. The brace or radius rod structure will then take up all longitudinal strains and stresses and twisting or torsional strains due particularly to brake torque and the push of the wheels, while at the same time the fulcrum and bearing connection of the brace structure will permit it to readily yield so as not to interfere with the proper functioning of the wheels and their suspension linkages and with either wheel structure free to rise and fall without interference with the other wheel structure.

On the arrangement shown the vehicle spring 10 is turned a distance on its longitudinal axis so that the spring may present a horizontal spring component against the longitudinal traction resistance or push of the wheel. The suspension linkage which includes the spring end will therefore be inclined as clearly shown in Figure 2, and the pivot ends 35 of the radius rod structure will be correspondingly inclined upwardly so that the axes of these ends will be parallel with the axes of the pivot connections of the spring ends with the link structures 9.

I preferably provide strap or stirrup structures 39 for limiting the movement of the vehicle chassis and spring ends away from each other as when the wheel drops into a hole or off the pavement and also during rebound or upward deflection of the chassis. This strap or stirrup structure is suitably suspended from the chassis and may be secured by the same bolts 40 that secure the shock absorber structure to the chassis. At its lower end each strap supports a rubber cushion 41 below the spring end for affording yielding and cushioning contact between the spring and the strap. A rubber bumper block 42 is secured to the chassis above the spring to limit the approach movement of spring and chassis as when the wheel encounters an obstruction in the roadway. This limitation of the relative movement between chassis and spring prevents undue and unnecessary movement of the suspension linkage and protects it against strain and injury.

The unitary radius rod structure which is fulcrumed at its apex by a universal joint at the center line of the vehicle and at the ends of its legs journalled in the wheel supporting link members of the suspension linkages forms a brace which takes up the brake torque and the road thrust on the wheels and protects the spring and associated linkage against torsional and longitudinal strains. As the vehicle travels and the wheels move up and down relative to the chassis the distance between the ends of the radius rod structure will vary slightly but the radius rod structure is sufficiently resilient to readily follow such dimension changes and this, together with the bearing connection of the radius rod structure with the chassis and the linkage structure, will permit the radius rod structure to efficiently function as a brace without in any wise interfering with the operation of the suspension linkages individually or together.

I have shown a practical and efficient embodiment of the various features of my invention but I do not desire to be limited to the exact construction and arrangement and operation shown and described as changes and modifications are possible which would still come within the scope of the invention.

I claim as my invention:

In individual wheel suspension for vehicles, the combination of a vehicle body, a pair of opposite wheels at one end of the body and a transverse cantilever spring rigidly secured at the central part to the vehicle body and extending between the wheels, a suspension linkage quadrilateral for each wheel of which the respective ends of the springs form the lower linkage, an outer side link for each linkage providing a bearing support for the respective wheel, each end of the spring being connected with the lower end of each side link member, an upper link member extending between the upper end of each side link member and the vehicle body, an integral wishbone radius rod structure having universal pivot connection at its apex with the vehicle body at the center line thereof and inwardly of said wheels, the legs of said wishbone structure terminating each in a cylindrical bearing end with an abutment shoulder thereon, said side link members having bores extending longitudinally of the vehicle and said bearing ends extending into the respective bores with their shoulders against the inner side of the side links, nuts engaging the outer portions of said bearing ends to abut against these outer faces of said side links whereby to prevent longitudinal movement of said bearing ends relative to said links but permitting relative rotational movement as said side links move vertically, the axes of said bearing connections crossing the center line of the wheel bearing whereby said wishbone arms will act as levers to prevent torsional displacement of said side links and springs connected therewith.

RALPH F. PEO.